(12) United States Patent
Wallace

(10) Patent No.: US 7,181,760 B1
(45) Date of Patent: Feb. 20, 2007

(54) HIGH AVAILABILITY MECHANISM IN A CABLE ENVIRONMENT

(75) Inventor: Robert Wallace, Portsmouth, RI (US)

(73) Assignee: Motorola, Inc, Horsham, PA (US)

( * ) Notice: Subject to any disclaimer, the term of this patent is extended or adjusted under 35 U.S.C. 154(b) by 782 days.

(21) Appl. No.: 09/625,873

(22) Filed: Jul. 26, 2000

(51) Int. Cl.
  *H04N 7/16* (2006.01)

(52) U.S. Cl. .................. 725/147; 725/116; 714/4; 370/217

(58) Field of Classification Search ........... 725/135, 725/136, 137, 138, 92, 93, 115, 116; 370/217, 370/218; 714/1, 2, 4, 15, 47, 13; 709/224, 709/95
See application file for complete search history.

(56) References Cited

U.S. PATENT DOCUMENTS

| 4,672,603 | A | * | 6/1987 | Conforti | 370/384 |
| 5,862,312 | A | * | 1/1999 | Mann et al. | 714/6 |
| 6,052,733 | A | * | 4/2000 | Mahalingam et al. | 709/235 |
| 6,442,160 | B1 | * | 8/2002 | Lindberg et al. | 370/369 |
| 6,480,551 | B1 | * | 11/2002 | Ohishi et al. | 375/260 |

* cited by examiner

Primary Examiner—Chris Kelley
Assistant Examiner—James Sheleheda
(74) Attorney, Agent, or Firm—Lawrence T. Cullen

(57) ABSTRACT

A scalable fault tolerant cable headend switching system using modular switching or multiplexing devices. A radio frequency switch connects a series of adjacent cable headend element to a series of output cables. At least one spare cable headend element is connected along with the series. Each cable headend element is configured to be readily swapped with adjacent elements. Output cables are cascaded away from a faulty element toward a spare element when a fault is detected.

7 Claims, 3 Drawing Sheets

HIGH AVAILABILITY MECHANISM IN A CABLE ENVIRONMENT

BACKGROUND OF THE INVENTION

The present invention relates to headend devices and more particularly to devices for providing high availability and fault tolerance in a cable system.

Cable communication systems typically route signals from a headend through trunk cables or fibers from which cables branch to individual users. The headend is the originating point in a communication system. Demand for connections through cable headends has greatly increased as cable usage has increased. Increased usage of cable modems and cable telephony is expected to place further demand upon headend operators. Cable headends therefore require high availability platforms having maximum fault tolerance for routing signals.

Providing a high availability platform in a cable headend environment is difficult. Typical cable headend units have multiple headend elements, each driving a separate cable wire. Physical limitation on the length of cable wire which can be driven by one headend element requires cable networks to be divided into smaller connection networks, each driven by a separate headend element. Even within these limits, cable headend units suffer high burnout, in part due to the power requirements and heat generated from driving a radio frequency (RF) signal. Failures often suddenly occur without prior indication, thereby causing an interruption in service. Typical radio frequency (RF) interfaces at a cable headend are switched using RF matrix switches which are well known to persons of ordinary skill in the art. Fault tolerance is achieved by using a matrix switch to transfer signals from a failed cable element to a good element. Any number of spare elements are typically provided for any set of cable elements that are attached to the matrix switch. A failed element is switched out when a fault is detected and an appropriate spare element is switched into its place while the fault is swapped out or repaired.

Fault tolerant systems have been developed to provide a single spare element which is capable of taking on the role of any one of a set of other elements in the cable headend. The number of spare elements and switching interfaces is reduced, thereby reducing cost and space requirements. Such fault tolerant systems are not scalable because they are typically switched using matrix switches which are available only in fixed N×N configurations. Incremental addition of a single spare element or a small number of spare elements in such systems may therefore require the expensive purchase and installation of a large matrix switch. Scalability is thus limited to installation of new element in blocks based on added switch matrixes.

BRIEF SUMMARY OF THE INVENTION

Accordingly, the present invention provides an apparatus and method for efficiently replacing failed elements in a cable headend. Each cable element in a fault tolerant cable headend system is configured to serve as a spare for at least one of its adjacent elements. Upon the failure of any element, an adjacent element is switched into the circuit of the failed element. The next adjacent element is switched into the circuit of the first adjacent element to take its place. A rippling sequence of shifting elements propagates until a spare unused element is switched into its neighbors place. The failed element may then be repaired or replaced (swapped out) and becomes a spare element, or the elements are shifted to their original position. No further switching is required until another failure occurs.

Switching may be implemented according to the present invention by using simple multiplexing devices. Each RF switch or multiplexing device may be installed as an individual module. A systems according to the present invention is therefore scalable to very large configurations in an economical and nearly linear manner.

The system according to the present invention is useful for applications where each elements is capable of performing the function of the adjacent elements that it may be called upon to replace. State information (if any) for an element should be available for at least one adjacent element. A system according to the present invention may be implemented using 3 to 1 multiplexing devices wherein any element is capable of replacing either of its adjacent elements.

Advantages of the present invention include automatic fault tolerance in a system which may be easily scaled up or down. A system according to the present invention also requires minimal real estate for extra components such as spare boards. Other advantages include simplicity in monitoring and fail over, in that an element need only monitor the functioning and state of an adjacent element, without a need for centralized monitor. Other advantages include ease of repair by technicians in that only a failed board in a system need be pulled out and replaced, instead of having to pull out several boards for reconfiguration.

DETAILED DESCRIPTION OF THE INVENTION

Figure 1:
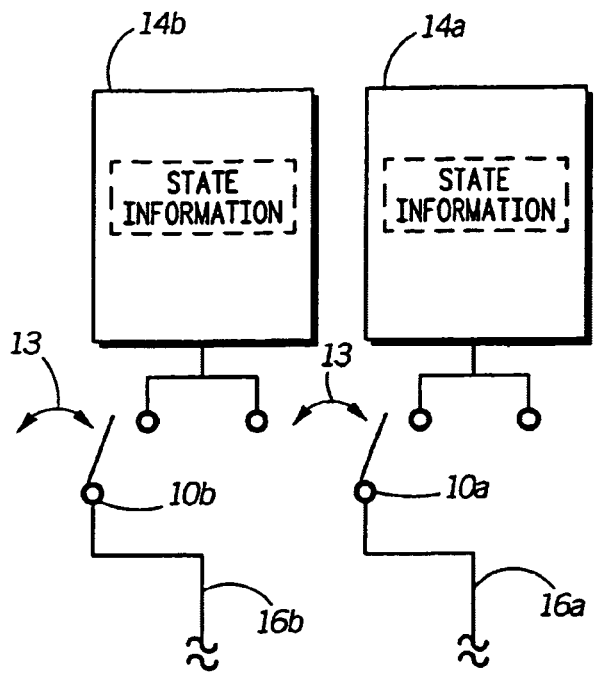
FIG. 1 is a block diagram of a system according to the present invention.

FIG. 1 shows a typical system according to the present invention including a headend element 14 and a switch 10. The headend element 14 is any type of transmitting or receiving unit used in a system where multiple similar headend elements 14 are in connection with separate circuits or networks 16. Examples include RF cable transmitters or receivers, ethernet or ATM drivers, optical drivers, repeaters, telephone circuits or terminators, modems including telephonic or cable, etc. Such elements 14 are typically on PC boards mounted close together in a backplane system. The switch 10 is any type of switch which selects between two (or more) connections, including relays, both mechanical and solid state, and multiplexers or demultiplexers. A headend element 14a is connected to one input of one switch or multiplexing device 10a and an adjacent headend element 14b is connected to another input of the multiplexing device 10a. The multiplexing device 10a is switchable to connect a line 16 to either of two adjacent headend elements 14, as shown by arrow 13.

Each element 14 has access to state information 15 regarding an adjacent element 14 that is connected to another input on a shared multiplexing device 12, as shown by arrow 17. State information 15 (if any) may be accessible either by maintaining individual element 14 state information in a centralized location separate from the elements 14 (not shown), or by providing element 14 with appropriate storage for both its own state information 15, and for it's adjacent neighbor. Each element 14 is thereby continuously prepared to be swapped into a role of an adjacent element 14.

Upon detection of a fault in any headend element 14 according to the present invention, the switch 10 is signaled to switch over so the adjacent element 14 is now driving the line 16 connections over to an adjacent element 14 in the direction of the nearest spare element. The elements 14 participating in a shift then refresh their status information in preparation for a later shift.

The failed element 14 may then be repaired or replaced to serve as the next spare element 18. Alternatively the system may shift back to employ the repaired or replaced element 14 and disconnect the original spare element 18.

Figure 2A:
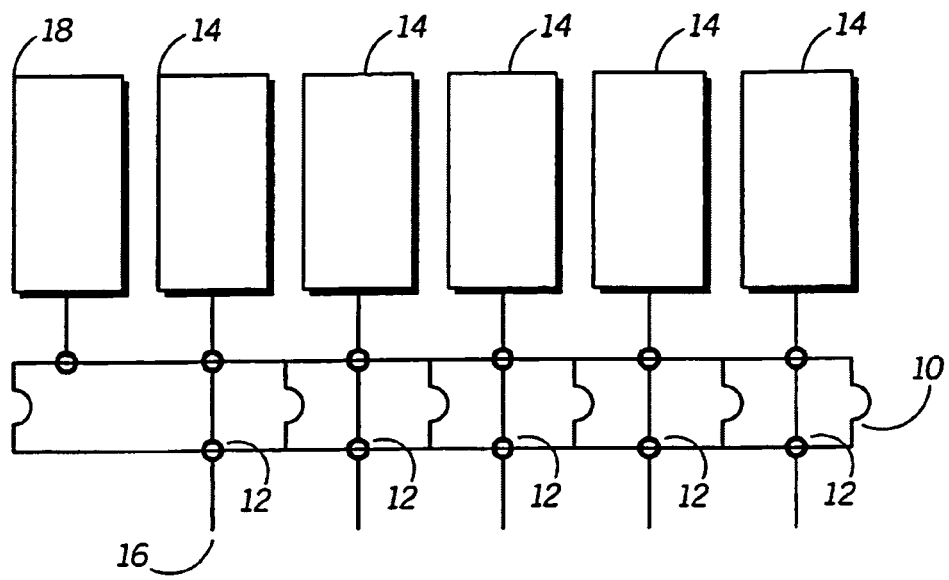
FIG. 2a is a block diagram showing an illustrative, embodiment according to the present invention.

Referring to FIG. 2a, an exemplary embodiment for a cable headend system according to the present invention is illustrated. The RF switch 10 includes a cascaded set of five 2–1 multiplexing devices 12. The RF switch 10 of the exemplary embodiment connects five elements 14 in a cable headend to five cable outputs 16 and includes one spare element 18. It can be seen by reference to the FIG. 2a that the multiplexing devices 12 are modular so that any number of multiplexing devices 12 may be cascaded to switch a corresponding number of elements 14. It will be apparent to persons of skill in the art that 3–1 multiplexing devices may be used in place of the 2–1 multiplexing devices 12 of the illustrated exemplary embodiment of FIGS. 2a–FIG. 2d.

The 2–1 multiplexing devices 12 may be switched to connect any cable output 16 to any of two headend elements 14. Accordingly each 2–1 multiplexing devices 12 provide a connections from a single cable output to a single headend element 14 or its adjacent element 14 on one side. Systems according to the present invention that employ 3–1 multiplexing devices are capable of switching a single cable output 16 from a single headend element 14 to either of its two adjacent elements 14.

Figure 2B:
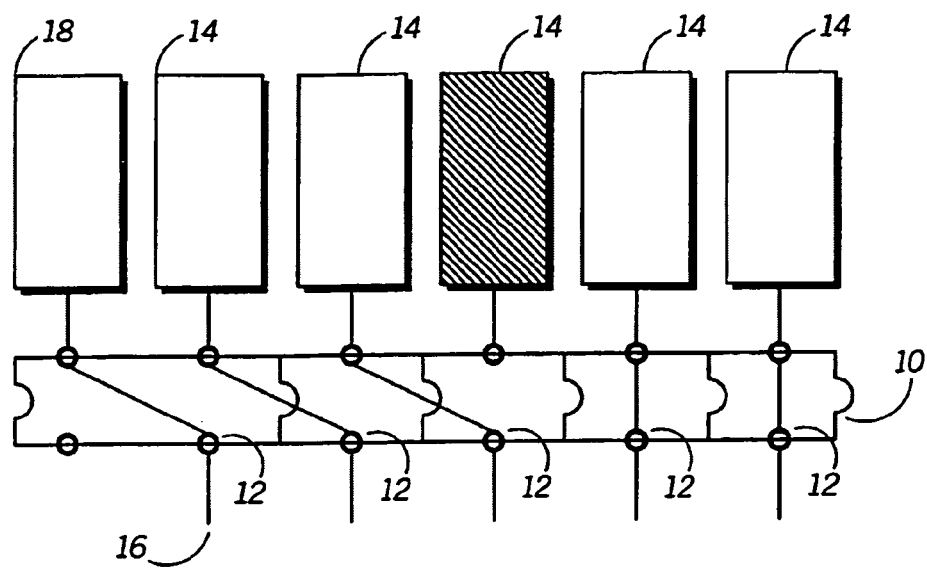
FIG. 2b is a block diagram showing how the illustrative embodiment in FIG. 2a compensates for a failed element.

Referring now to FIG. 2b, the condition of the exemplary embodiment is illustrated after a failure of a single element 14' has occurred. Upon detection of the failure, the 2–1 multiplexing devices 12 for the failed element 14' switches over so the adjacent element 14 takes over driving the cable output of the failed element 14'. Either simultaneously, or in a ripple fashion, the 2–1 multiplexing devices 12 for each adjacent element 14 switches over until all cable outputs 16 are driven, with the spare element 18 now filling in for its adjacent element 14. It can be seen that three of the 2–1 multiplexing devices 12 have changed state to shift connections of three cable outputs 16 to adjacent elements. Each element 14 from the failed element 14' to the spare element 18 is functionally replaced by the element 14 to its left.

Figure 2C:
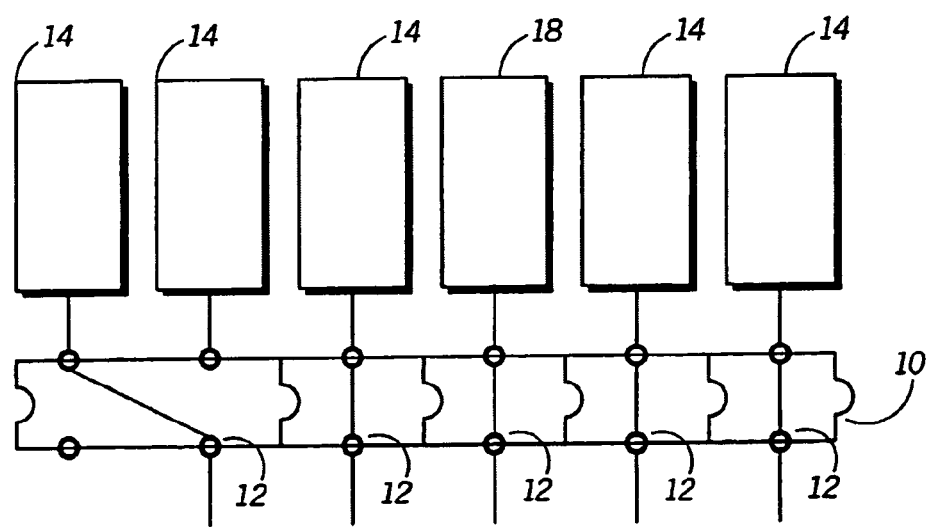
FIG. 2c is a block diagram showing the illustrative embodiment of FIG. 2b after the failed element has been repaired or replaced.

Referring now to FIG. 2c, the condition of the exemplary embodiment is illustrated after the failed element 14' of FIG. 2b, is repaired or replaced. The repaired or replaced element becomes the new spare element 18. Alternatively, the 2–1 multiplexing devices 12 all switch back to their original settings, whereupon the end element 14 will again be the spare, as shown in FIG. 2a. However, it is not necessary to "reset" the system in this way, as will be described.

Figure 2D:
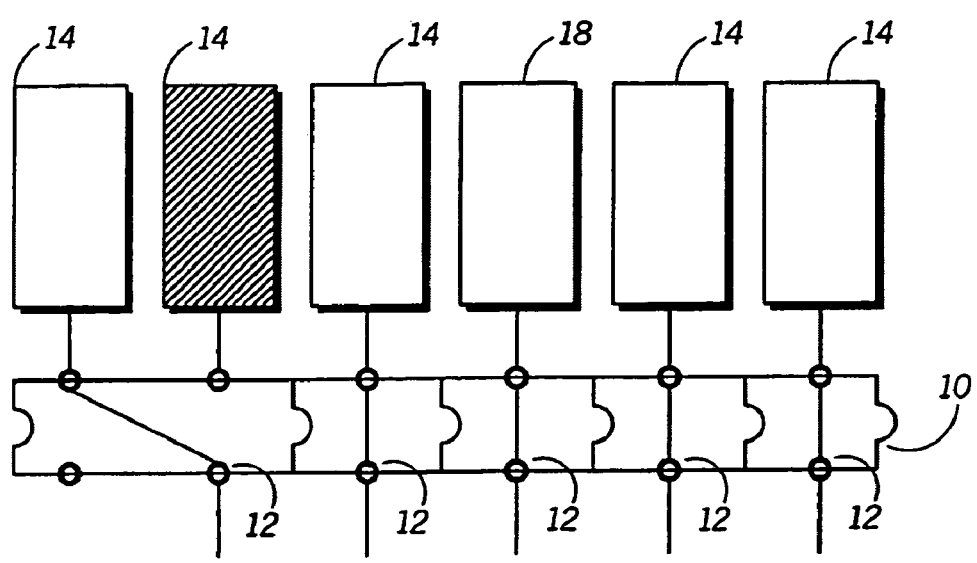
FIG. 2d is a block diagram showing how the illustrative embodiment of FIG. 2c compensates after another element has failed.

Referring to FIG. 2d, the condition of the exemplary embodiment of FIG. 2c is illustrated after a second failure has occurred, this time in element 14' FIG. 2d. It can be seen that two 2–1 multiplexing devices 12 are switched back to their initial state thereby cascading two cable outputs 16 toward the right and connecting them to good elements 14. A feature of the present invention is that as elements 14 fail and are replaced, the position of the spare element 18 can move around the system, and the 2–1 multiplexing devices 12 will always be able to configure the system so that all cable outputs 16 are driven.

The control of monitoring the system switching headend elements 14 may be performed by a separate monitoring and control system (not shown), or may be performed in a autonomous fashion by the individual headend elements 14. This autonomous monitoring ability as a useful feature of the present invention. All a headend element 14 has to do is know the state (status information) of it's adjacent element 14 (which can be determined by noting which element 14 it would replace if the switch device 12 switches over), and if it's adjacent element 14 is responding. If the adjacent element 14 stops responding, then the headend element 14 informs the switch device 12 to switch over, and updates it's state to be that of the failed adjacent element 14. The headend element finally stops responding to its neighbor's 14 monitoring, thereby causing the neighbor 14 to perform this same switchover, thereby rippling down the system until the spare element 18 is reached. Therefore, the system can shift over autonomously, without the need for central monitoring and control. The spare element 18 monitors the state 15 of its adjacent element 14, the only difference is that the spare element 18 is offline until it is switched in and takes over for its adjacent element.

If a higher level of fault tolerance is desired, then 3–1 multiplexing devices 12 can be employed, whereby a failed element 14' can be replaced an adjacent element on either side (not shown). The advantage to this configuration of the present invention is two (or more) spare elements 18 may be used, with the spare elements 18 initially positioned at either end of the system. This configuration of the present invention allows for multiple element 14 failures. Both spare elements 18 may then move around the system, which has higher reliability because multiple elements 14 can fail before the system must be serviced.

Any number of modular multiplexing devices 12 are cascaded to form an RF switch 12 for a fault system at a cable headend. Each element 14 is capable of performing the functions of at least one adjacent element 14 and stores relevant status information regarding the at least one adjacent element 14 to facilitate rapid substitution when a failure of an element 14 occurs. Multiplexing devices 12 may be added or removed in a modular fashion to facilitate scaling of the system.

In at least one embodiment of the present invention, a cable headend element is a cable modem termination system such as a model CAS 2000 produced by Motorola Corporation. It should be apparent to persons of skill in the art that any number of headend elements may be switched according to the present invention to provide a low cost scalable fault tolerance system. Persons having ordinary skill in the art will recognize that an RF switch 10 according to the present invention may also be manually or automatically controlled to disconnect an element 14 and shift specific output cables 16 toward a spare element 18. The invention may thereby be used to facilitate routine maintenance operations as well as to provide fault tolerance.

Although exemplary embodiments have been described, other embodiments and modifications of the invention are intended to be covered by the spirit and scope of the appended claims.

I claim:

1. A fault tolerant headend system comprising:
    at least two headend elements, a first headend element and an adjacent headend element;
    at least one switching device having an output port capable of connecting to one of at least two inputs ports wherein one input port is connected to said first headend element and another input port is connected to said adjacent headend element;
    wherein said output port of each switching device is connectable to an output cable;
    wherein said adjacent headend element is capable of taking over functioning of said first headend element; and
    at least one of said headend elements is a spare headend element,
        wherein said first headend element includes state information for both said first headend element and said adjacent headend element in storage located within said first headend element, said state information accessible by said adjacent headend element.

2. The system according to claim 1 wherein a plurality of said switching devices are configurable in modular fashion wherein individual switching devices are installable and removable to scalably configure capacity.

3. The system according to claim 1 wherein said headend system is a cable headend system.

4. The system according to claim 1 wherein each of said switching devices is a 2 to 1 switching device having two input ports and one output port.

5. The system according to claim 1 wherein each of said switching devices is a 3 to 1 switching device having three input ports and one output port.

6. A fault tolerant headend system comprising:
    a plurality of headend elements, including at least a first headend element and an adjacent headend element;
    at least one switching device having an output port capable of connecting to one of at least two inputs ports wherein one input port is connected to said first headend element and another input port is connected to said adjacent headend element;
    wherein said output port of each switching device is connectable to an output cable;
    wherein said adjacent headend element is capable of taking over functioning of said first headend element;
    wherein at least one of said headend elements is a spare headend element, and
    wherein said plurality of headend elements are arranged in a row, wherein if one headend element fails, said switching devices shift at least one headend element so that only a headend element adjacent to said failed headend element takes over for said failed headend element; and said spare headend element only takes over for a headend element adjacent to said spare headend element.

7. A method of providing a fault tolerant headend system comprising:
    connecting a plurality of adjacent headend elements to a series of switching devices wherein at least one of said headend elements is a spare headend element and wherein each headend element is capable of taking over functioning of at least one adjacent headend element;
    detecting a fault in one of said headend elements;
    shifting headend elements, comprising:
    configuring a headend element adjacent to said fault detected headend element to take over functioning of said fault detected headend element; and
    changing a state of specific switching devices to connect said adjacent headend element to an output cable of said fault detected headend element; and
    performing said steps of shifting headend elements in the direction of a spare headend element until the spare element is connected to an output cable,
    wherein each of said plurality of headend elements includes state information only for itself and its immediately adjacent headend elements.

* * * * *